(12) United States Patent
Kozel et al.

(10) Patent No.: US 11,362,489 B2
(45) Date of Patent: *Jun. 14, 2022

(54) SUBSTATION FOR MEDIUM OR HIGH VOLTAGE, CONTAINING SWITCHGEAR OR CONTROLGEAR WITH UNMANNED OPERATION AND MAINTENANCE

(71) Applicant: ABB Schweiz AG, Baden (CH)

(72) Inventors: Tomas Kozel, Brno (CZ); Thomas Schmidtchen, Houston, TX (US); Martin Stefanka, Rajhrad (CZ)

(73) Assignee: ABB Schweiz AG, Baden (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/727,982

(22) Filed: Dec. 27, 2019

(65) Prior Publication Data

US 2020/0136357 A1 Apr. 30, 2020

Related U.S. Application Data

(63) Continuation of application No. PCT/EP2018/066973, filed on Jun. 25, 2018.

(30) Foreign Application Priority Data

Jun. 28, 2017 (EP) ..................................... 17178385
Dec. 21, 2017 (EP) ..................................... 17209512

(51) Int. Cl.
*H02B 3/00* (2006.01)
*H02B 7/06* (2006.01)
(Continued)

(52) U.S. Cl.
CPC .............. *H02B 3/00* (2013.01); *B25J 11/005* (2013.01); *H02B 7/00* (2013.01); *H02B 7/06* (2013.01)

(58) Field of Classification Search
CPC ..... H02B 3/00; H02B 7/00; H02B 7/06; B25J 11/005
See application file for complete search history.

(56) References Cited

U.S. PATENT DOCUMENTS 7,576,985 B2 * 8/2009 Kingston ............. H02B 13/025
165/104.33
8,878,687 B2 * 11/2014 Shiraishi .............. H05K 5/0021
340/693.6
(Continued)

FOREIGN PATENT DOCUMENTS

CN 101604825 A 12/2009
CN 101692530 A 4/2010
(Continued)

OTHER PUBLICATIONS

Jean-Francois Allan et al: "Robotic systems applied to power substations—A state-of-the-art survey", Proceedings of the 2014 3rd International Conference on Applied Robotics for the Power Industry, Jan. 1, 2014 (Jan. 1, 2014), pp. 1-6, XP055471456.
(Continued)

*Primary Examiner* — Robert J Hoffberg
(74) *Attorney, Agent, or Firm* — Leydig, Voit & Mayer, Ltd.

(57) ABSTRACT

A substation for medium or high voltage includes: switchgear or controlgear with unmanned operation and maintenance; an inner room in which the switchgear or controlgear is located, the inner room being hermetically enclosed by an outer housing, the inner room being locked against the outer housing by an inner, automatically operated door; and a robot system, the robot system being implemented such that an acting area of the robot system is extended from the inner room, partly in an area outside the inner room, but within the
(Continued)

substation internal space, where spare parts are stored in a spare parts hand over area, for maintenance.

4 Claims, 2 Drawing Sheets

(51) Int. Cl.
    *B25J 11/00*     (2006.01)
    *H02B 7/00*     (2006.01)

(56) References Cited

U.S. PATENT DOCUMENTS

| | | | |
|---|---|---|---|
| 10,744,124 B2 | 8/2020 | Zaid et al. | |
| 10,751,330 B2 | 8/2020 | Zaid et al. | |
| 11,146,045 B2* | 10/2021 | Kozel | H02B 11/133 |
| 2004/0176875 A1 | 9/2004 | Iribe et al. | |
| 2011/0067781 A1 | 3/2011 | Osborne | |
| 2013/0231779 A1 | 9/2013 | Purkayastha et al. | |
| 2015/0364285 A1 | 12/2015 | Shinde et al. | |
| 2017/0085064 A1 | 3/2017 | Cassimere et al. | |
| 2020/0127446 A1* | 4/2020 | Kozel | H02B 13/00 |
| 2020/0127447 A1* | 4/2020 | Kozel | H02B 3/00 |
| 2020/0127448 A1 | 4/2020 | Kozel et al. | |
| 2020/0136358 A1* | 4/2020 | Kozel | B25J 11/005 |
| 2020/0147061 A1 | 5/2020 | Zaid et al. | |
| 2020/0153210 A1 | 5/2020 | Kozel et al. | |
| 2020/0265572 A1* | 8/2020 | Rossano | G01N 21/8851 |

FOREIGN PATENT DOCUMENTS

| | | |
|---|---|---|
| CN | 102056581 A | 5/2011 |
| CN | 102122844 A | 7/2011 |
| CN | 102280826 A | 12/2011 |
| CN | 202333477 U | 7/2012 |
| CN | 202649815 U | 1/2013 |
| CN | 202678813 U | 1/2013 |
| CN | 203660309 U | 6/2014 |
| CN | 203788404 U | 8/2014 |
| CN | 204012372 U | 12/2014 |
| CN | 205021584 U | 2/2016 |
| CN | 105415380 A | 3/2016 |
| CN | 205206469 U | 5/2016 |
| CN | 205380658 U | 7/2016 |
| CN | 105881505 A | 8/2016 |
| CN | 105958344 A | 9/2016 |
| CN | 106003084 A | 10/2016 |
| CN | 106165048 A | 11/2016 |
| CN | 106223775 A | 12/2016 |
| CN | 106340006 A | 1/2017 |
| CN | 205944755 U | 2/2017 |
| CN | 106647569 A | 5/2017 |
| CN | 106856311 A | 6/2017 |
| JP | 6-233419 A | 8/1994 |
| JP | H 09130929 A | 5/1997 |
| JP | 2007172735 A | 7/2007 |
| WO | WO 2015081455 A1 | 6/2015 |

OTHER PUBLICATIONS

Terence Hazel et al: "IEC switchgear & controlgear—internal arc withstand a designer's and user's view", PCIC Europe 2013, Jun. 1, 2011 (Jun. 1, 2011), pp. 1-12, XP055514149.

Chen, "Electrical Design Manual for Intelligent Building," *China Building Materials Industry Press*, Book 2, 1115-1119 (Aug. 1999).

Lu et al., "Mobile Robot for Power Substation Inspection: A Survey," *IEEE/CAA J. of Automatica Sinica*, 4(4), 830-847 (Jan. 25, 2017).

Menéndez et al., "Robotics in Power Systems: Enabling a More Reliable and Safe Grid," *Industrial Electronics Magazine*, IEEE, 11(2): 22-34 (Jun. 23, 2017).

Toth et al., "Smart View for a Smart Grid—Unmanned Aerial Vehicles for Transmission Lines," *2010 1st International Conference on Applied Robotics for the Power Industry*, IEEE, pp. 1-6 (Oct. 5-7, 2010).

Velrajkumar et al., "Development of Real-Time Tracking and Control Mobile Robot using Video Capturing Feature for Unmanned Applications," *2010 International Conference on Communication Control and Computing Technologies IEEE*, 90-92 (Oct. 7-9, 2010).

* cited by examiner

SUBSTATION FOR MEDIUM OR HIGH VOLTAGE, CONTAINING SWITCHGEAR OR CONTROLGEAR WITH UNMANNED OPERATION AND MAINTENANCE

CROSS-REFERENCE TO PRIOR APPLICATIONS

This application is a continuation of International Patent Application No. PCT/EP2018/066973, filed on Jun. 25, 2018, which claims priority to European Patent Application No. EP 17 209 512.7, filed on Dec. 21, 2017 and to European Patent Application No. EP 17 178 385.5, filed on Jun. 28, 2017. The entire disclosure of the foregoing applications is hereby incorporated by reference herein.

FIELD

The invention relates to a substation for medium or high voltage, containing switchgear or controlgear with unmanned operation and maintenance.

BACKGROUND

The switchgear or controlgear with unmanned operation and maintenance excludes human operators from operation and maintenance processes of the switchgear or controlgear as we know them today.

So far systems like that are automized, nevertheless, the entrance for human operators has to be restricted, when primary circuits are energized.

SUMMARY

In an embodiment, the present invention provides a substation for medium or high voltage, comprising: switchgear or controlgear with unmanned operation and maintenance; an inner room in which the switchgear or controlgear is located, the inner room being hermetically enclosed by an outer housing, the inner room being locked against the outer housing by an inner, automatically operated door; and a robot system, the robot system being implemented such that an acting area of the robot system is extended from the inner room, partly in an area outside the inner room, but in the substation internal space, where spare parts are stored in a spare parts hand over area, for maintenance.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
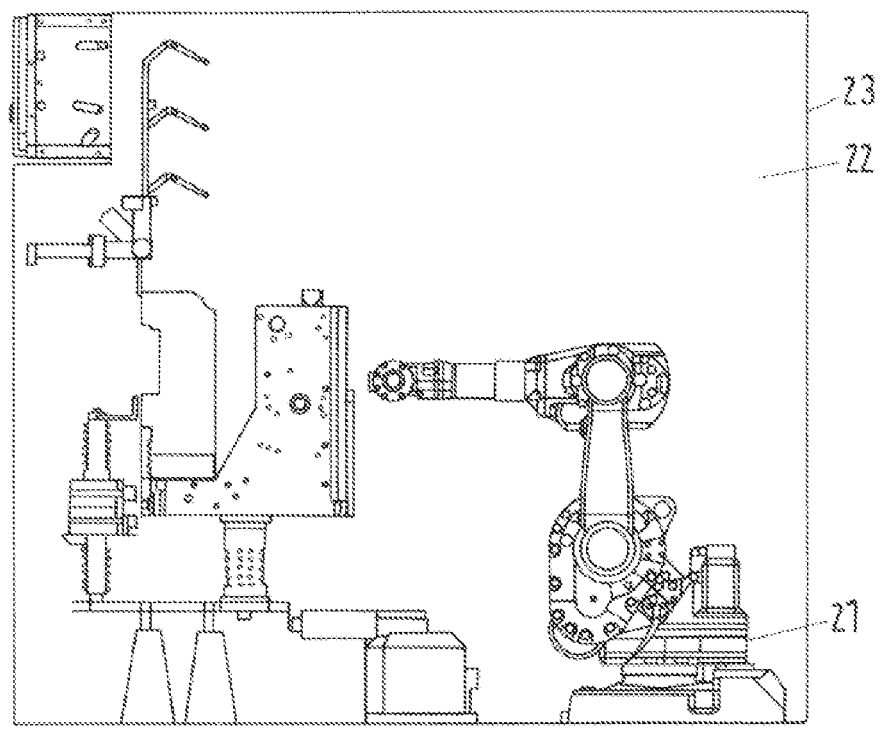
FIG. 1 Example cross section of switchgear or controlgear with unmanned operation and maintenance.

In an embodiment, the present invention provides the ability to proceed the operating and/or maintenance of such substations in an automized way, and just in case of further need of human operator, to enhance security for the human operator.

First, the aforesaid substation is operated automatically. For that, a robot system is used, to operate inside an operation room where the switchgear or the controlgear is located in, and which is implemented inside the outer housing.

Therefore further several sensor means located in the substation internal space and/or at the door of the substation, which are able to detect the entrance of a human operator.

A further important consequent feature of the invention is, that if the inner room is automatically restricted by inner door locking when current carrying parts are energized, the switchgear or controlgear don't need a further compartment.

The robotic system of the switchgear or the controlgear with unmanned operation and maintenance shall require maintenance and spare parts sourcing. The robotic system is inaccessible by human inside the switchgear or controlgear outer housing when the primary circuits are energized.

By adding the robotic system to inner space or room of the switchgear or controlgear, a new complex system was however introduced into the switchgear or controlgear and this system would require maintenance itself. Another expectation is, that the robotic system can get spare parts for the switchgear or controlgear maintenance. Even though the human interactions with the switchgear or controlgear shall be much less frequent in comparison to current practices, the human operator safety interlocks for the switchgear or controlgear with unmanned operation and maintenance must be defined.

In a further advantageous embodiment, human operator presence sensors are implemented within the substation internal space, such that if current carrying parts in the inner room, where the switchgear or controlgear is located, are energized, locking means at the door of the inner room automatically lock that door, where in the inner room only the robot system is allowed to operate.

In a further advantageous embodiment, the inner room is as well a hermetically closable compartment.

By that it is possible, that inside this inner compartment of the substation, the switchgear as such need no further enclosure itself, because it is secured against entrance of human operator by the locked door, in case of energized current carrying parts.

According to the method of operating such a substation, the inner room is locked against the outer housing by an inner, automatically operated door, and that locking and de-locking of that door is logically controlled by evaluation of an automatic sensing of the presence of human operator AND the energy status on current carrying parts of the switchgear or controlgear and/or the busbars, and that a robot system is implemented such that the robot system's acting area is extended from in the inner room, to partly in the area outside the inner room, but still within the substation internal space, where spare parts are stored in a spare parts hand over area, for maintenance.

An advantageous method for maintenance is, that for maintenance or repair of the robot, an area 54 is predefined as repair and maintenance area, which is located outside the inner room and within the substation internal space, where a human operator is allowed to enter, if the inner room, where the switchgear or controlgear of the inner room is energized, is locked by the door of the inner room. By that, high requirements for human operators safety are implemented.

There are two options for accessing the robotic system and supplying the spare parts for the switchgear or controlgear:

either all primary circuits of the switchgear or controlgear have to be completely de-energized to make the switchgear or controlgear internal space 22 safe for human access or the robotic system 21 has to be allowed to get out of the switchgear or controlgear outer housing 23 for interaction if necessary.

Figure 2:
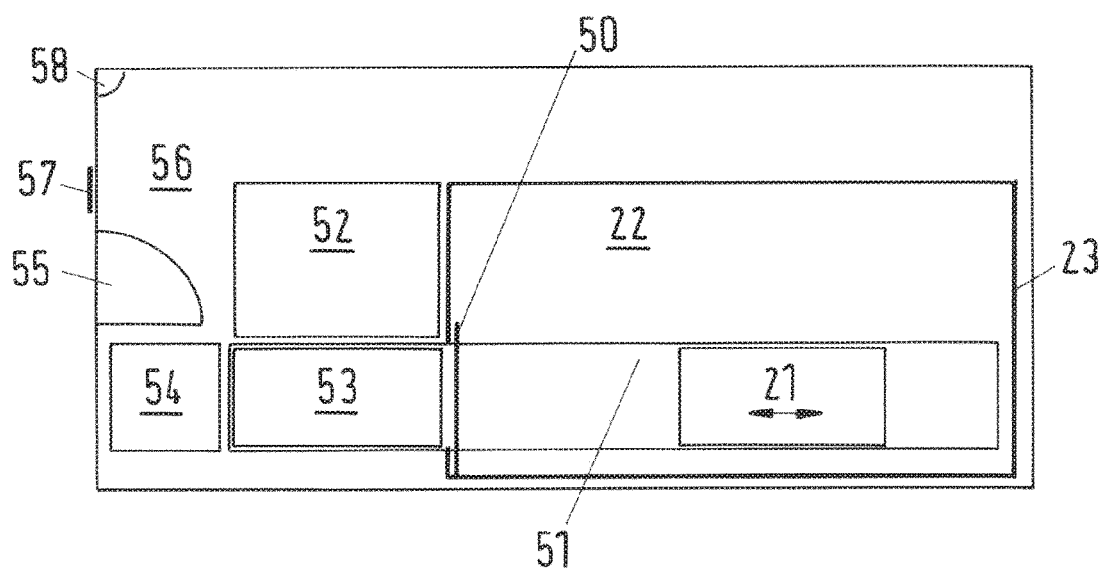
FIG. 2 Example of the substation floor plan and location of the human machine interfaces for a switchgear or controlgear with unmanned operation.

The second option is more desirable with respect to the switchgear or controlgear service continuity and uptime. To allow robotic system 21 movement out of the enclosure, a dedicated door 50 on the switchgear or controlgear outer housing 23 is suggested—see FIG. 2.

The door is arc proof when closed and dimensioned to allow passing of the robotic system with docked manipulator through. The door open only for the period needed for the robot moving through, they are closed for the rest of the time. The door is preferably located on one lateral side of the switchgear or controlgear to allow predefined robotic movement area 51 to be as simple and narrow as possible.

The robotic system predefined movement area 51 is extended out of the switchgear or controlgear outer housing 23. The default robotic system position is inside the switchgear or controlgear outer housing 23 where it fullfills its tasks.

During the short period of robot moving through opened door 50 the arc proof enclosure 23 of the switchgear or controlgear is compromised. Human personnel safety must be ensured at that time by making sure no operator is in the substation internal space 56 before opening the switchgear or controlgear door 50. An interlocking system for the switchgear or controlgear door 50 shall be applied preventing its opening in following cases:

An operator is present in the substation internal space 56 or robot repair area 54

The door to substation 55 is opened

The operator presence in the substation can be learned by one or combination of following systems:

Person presence detection system based on human presence sensors 58

Manually triggered electrical or mechanical interlock activated by operator before entry at the external substation interface 57. The interlock unlocks the substation door 55 and at the same time locks the switchgear or controlgear door 50.

Another interlocking system acting in the human safety assurance shall be applied to the substation entry door 55 preventing opening of the substation entry door from outside in case the switchgear or controlgear door 50 is are not positively confirmed closed and locked against opening. Activation of this interlock shall be clearly signalled on the local external substation interface 57 for the operator to know the substation entry door 55 is are interlocked.

The local external substation interface 57 shall provide interface for local commands by operator, who is prepared to enter the substation or who is leaving the substation and local signalization of the switchgear or controlgear status.

The available commands for robotic system should be as minimum:

Stay in the internal switchgear or controlgear area 22 and lock the switchgear or controlgear door 50 as a human operator is going to enter the substation for spare parts handling or other tasks where robot shall stay inside the switchgear or controlgear Get out to human-machine interaction area 53, lock the switchgear or controlgear door 50 and stay docked as a human operator is going to enter the substation for maintenance or repair job on the robotic system All clear—operate freely as no human is inside the substation The local external substation interface can be in form of an intelligent electronic device, group of switches or key exchange box or combination of these devices.

To further enhance the human operator safety, two special areas with restricted access can be defined as follows:

spare parts handover area 52 robot repair area 54

The spare parts handover area 52 shall be built as spare parts storage area, where robot autonomously takes needed spare parts and stores replaced parts. The human-machine interaction in this area is indirect, human is allowed to operate in this area only if robot is not in the human-machine interaction position 53. Human personnel tasks are removing the replaced parts and filling in fresh spare parts in case the stock is used up. The human unauthorized operation in this area is prevented preferably by fencing or enclosure with lock. The lock allows access only if the robotic system is inside the switchgear or controlgear enclosure 23 and the switchgear or controlgear door 50 is locked.

The robot repair area 54 is an area, which is designed for human operator performing the robot repair or maintenance. The robot repair area shall be designed so, that with the manipulator docked the human operator can access all points of robot maintenance or repair. It shall be safe to run a robot operation routine checks when operator is inside the robot repair area. The repair area is protected against unauthorized entry preferably by fencing or enclosure with lock. The lock allows entry only when robot is in human-machine interaction area 53 with docked manipulator ready for maintenance intervention and the switchgear or controlgear door 50 is are locked.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMBERING 21 robotic system, robot
22 space, inner room 23 outer housing, arc close
50 door, automatic door
51 movement area
52 spare parts hand over area
53 interaction area
54 robot repair area
55 substation entry door, outer door
56 substation internal space
57 external substation interface
58 human operator presence sensors

What is claimed is:

1. A substation for medium or high voltage, comprising:
   switchgear or controlgear;
   a substation entry door configured to permit a human operator entry into and exit from the substation;
   an inner room in which the switchgear or controlgear is located, the inner room being hermetically closable by an outer housing and an inner, automatically operated door lockable against the outer housing; and
   a robot system having an acting area that extends from the inner room to a human-machine interaction position outside the inner room, wherein the substation has a substation internal space within the substation outside of the inner room, the substation internal space having a spare parts handover area,
   wherein, in the human-machine interaction position, the robot system is configured so as to access the spare parts handover area, and
   wherein the substation entry door is configured to be unopenable from outside the substation if the inner, automatically operated door is unlocked.

2. The substation according to claim 1, further comprising:
   human operator presence sensors within the substation internal space,
   wherein, if the switchgear or controlgear is energized, the inner, automatically operated door is configured to automatically lock, wherein inside the inner room only the robot system is allowed to operate.

3. A method for operating a substation for medium or high voltage, the substation including switchgear or controlgear disposed in an inner room that is hermetically encloseable in part by an outer housing, the method comprising:
   locking the inner room against the outer housing using an inner, automatically operated door;
   logically controlling locking and de-locking of the inner, automatically operated door by evaluation of an automatic sensing of a presence of a human operator outside of the inner room and an energy status of current carrying parts of the switchgear or controlgear;
   providing a robot system having an acting area that extends from the inner room to a human-machine interaction position outside the inner room; and
   providing a substation entry door configured to permit the human operator entry into and exit from the substation, wherein the substation has a substation internal space within the substation outside of the inner room, the substation internal space having a spare parts handover area,
   wherein, in the human-machine interaction position, the robot system is configured so as to access the spare parts handover area, and
   wherein the substation entry door is configured to be unopenable from outside the substation if the inner, automatically operated door is unlocked.

4. The method according to claim 3, further comprising:
   providing a repair and maintenance area, located outside the inner room, for repair or maintenance of the robot system,
   wherein, if the switchgear or controlgear is energized, the human operator is allowed to enter the substation internal space only if the inner room is locked by the inner, automatically operated door.

* * * * *